United States Patent [19]

Chretien

[11] Patent Number: 4,811,777
[45] Date of Patent: Mar. 14, 1989

[54] DEVICE FOR AT LEAST PARTLY CLOSING A VERTICAL OPENING IN A BUILDING AND ITS USE AS A MECHANICAL ANTI-FREEZE SHUTTER

[75] Inventor: Michel J. E. Chretien, Saint Cyr l'ecole, France

[73] Assignee: MacGregor-Navire (F) S.A., France

[21] Appl. No.: 70,971

[22] Filed: Jul. 8, 1987

[30] Foreign Application Priority Data

Jul. 9, 1986 [FR] France ................ 86 10019
Jun. 30, 1987 [FR] France ................ 87 09247

[51] Int. Cl.⁴ .......................................... E05D 15/16
[52] U.S. Cl. ........................... 160/201; 160/189
[58] Field of Search ............... 160/201, 188, 189, 190, 160/1, 7, 9, 265

[56] References Cited

U.S. PATENT DOCUMENTS

| | | | |
|---|---|---|---|
| 1,936,300 | 11/1933 | Guss | 160/188 X |
| 2,789,636 | 4/1957 | Lawick | 160/188 |
| 2,909,718 | 10/1959 | Lawick | 160/188 X |
| 2,920,151 | 1/1960 | Lawick | 160/188 |
| 2,947,354 | 8/1960 | Nectoux | 160/201 X |
| 3,017,218 | 1/1962 | Groth et al. | 160/201 X |
| 3,129,040 | 4/1964 | DeRose | 160/188 X |
| 3,166,306 | 1/1965 | Peltier | 160/188 |
| 3,981,343 | 9/1976 | DeVito | 160/190 X |
| 4,341,253 | 7/1982 | Eyerle | 160/133 |
| 4,628,646 | 12/1986 | Eyerle | 160/201 X |
| 4,690,195 | 9/1987 | Taylor | 160/265 X |

FOREIGN PATENT DOCUMENTS

| | | |
|---|---|---|
| 387600 | 1/1924 | Fed. Rep. of Germany . |
| 2036560 | 2/1972 | Fed. Rep. of Germany . |
| 3021310 | 12/1981 | Fed. Rep. of Germany . |
| 3347265 | 7/1985 | Fed. Rep. of Germany . |
| 1237619 | 6/1960 | France . |
| 454205 | 6/1968 | Switzerland . |

Primary Examiner—Ramon S. Britts
Assistant Examiner—David M. Purol
Attorney, Agent, or Firm—Steinberg & Raskin

[57] ABSTRACT

A device for at least partially closing a vertical passageway opening in a building by means of a continuous transversely stiff and longitudinally flexible curtain supported on each side by a curtain-carrying chain fitted with rollers riding in a corresponding lateral guideway, the chain being secured to the edge of the curtain and extending over at least the whole length thereof.

13 Claims, 5 Drawing Sheets

DEVICE FOR AT LEAST PARTLY CLOSING A VERTICAL OPENING IN A BUILDING AND ITS USE AS A MECHANICAL ANTI-FREEZE SHUTTER

BACKGROUND OF THE INVENTION

The present invention relates essentially to a device for at least partially closing a vertical opening in a building, such as for instance, a large-sized shed door opening.

The invention is in particular applicable as a mechanical anti-freeze shutter in particular for the purpose of protecting the inside of the scattering area of an atmospheric cooling tower for a nuclear power generating plant or station.

There are already known devices for closing by means of a continuous transversely rigid and longitudinally flexible screen or shutter such in as, particular, a unidirectionally corrugated or fluted curtain guided on both opposite longitudinal sides by two lateral guideways or tracks, respectively, each one comprising a substantially vertical portion for the straight controlled translatory drive motion with a view to perform an at least partial closing and an opening of the passage-way opening. In such devices, the screen or shutter is usually wound up for opening the passage-way opening in one or several turns, coil layers or like convolutions on a drive support such as a cylindrical roll or a drum.

SUMMARY OF THE INVENTION

The object of the present invention is to provide a system of a simpler design and construction, in particular for an easy arrangement or storage accommodation of the curtain or screen while avoiding any deformation in the vertical position thereof under the action of its own weight or of a temporary overload such as ice.

The solution according to the present invention for reaching that goal consists in a device for at least partly closing a vertical passage-way opening in a building by means of a continuous transversely rigid or stiff and longitudinally flexible or yielding curtain such as, in particular, a unidirectionally corrugated or fluted curtain, screen or like shutter guided on both opposite sides by two lateral runways or like tracks, respectively, each comprising a vertical portion for the controlled straight translatory motion for at least partially closing and for opening the passage-way opening, the runways each comprising an upper portion for the straight translatory storage motion, connected to the vertical portion through an arcuate intermediate portion and characterized in that the curtain is supported on each side by a curtain-carrying chain fitted with rollers displaceable or riding in the corresponding lateral runaway, said chain being secured to the edge of the curtain and extending over at least the whole length of the curtain.

Thus, in this new system the curtain may not be deformed by its own weight or under the action of an overload in the vertical closing position.

According to another feature of the invention, each curtain-carrying chain is associated with an endless flexible drive gearing member such as a cable, rope or chain extending horizontally and outside of the curtain and reeved over two drive and driven idler end guide pulleys, respectively, and preferably comprising tensioning, stretching or like tightening means.

The present invention is also directed to the applying or use of the closing device previously referred to as an anti-freeze shutter to protect in particular the inside of the scattering area of an atmospheric cooling tower of a nuclear power generating plant or station wherein the hot cooling water is cooled down through heat exchange with the outer air with a view to be recycled.

During the winter periods however the cold outer air causes ice to be formed over the whole or one part of the scattering area and the ice wall thus formed would limit the intake of the air required for carrying out the heat exchange. The device according to the invention allows on the one hand to avoid or to restrict the formation of ice during the cold season where the passage-way opening is at least partially closed while permitting the heat exchange with the outside air and, on the other head, to readily return to normal working conditions as soon as positive temperatures are prevailing.

Moreover, during the operation of the device according to the invention for the opening or the at least partial closing of the passage-way opening by the curtain, undue forces may occur, such as those resulting for instance from a jamming of the rollers of the curtain-carrying chain in their corresponding guideways or from the formation of ice on the curtain thereby overloading the same. Such forces are likely to damage some elements of the device, such as for instance the endless flexible curtain-driving transmission member extending horizontally and outside of the curtain or even to cause the same to fail or the break.

Furthermore, when using the closing device described hereinabove as a mechanical anti-freeze shutter adapted to protect in particular the inside of the scattering area of an atmospheric cooling tower for a nuclear power generating plant or station. intermediate stop positions are provided for the curtain with a view to control or adjust the air intake in accordance with the outside temperature. At each one of these stop positions, the weight of the curtain is directly supported by the curtain-carrying chains hence by the drive members. Now, ice formations may unduly overload the curtain.

Therefore, it is necessary to protect the drive or conveyance members from such overloads and independently of the protection described hereinabove during the operation.

The present invention therefore is also aiming at removing the inconveniences referred to hereinabove by providing a device for at least partially closing a vertical passage-way opening in a building by a continuous transversely stiff and longitudinally flexible curtain and characterizd in that the control means are an irreversible motor-speed reducer set mounted in floating relationship and in that it comprises a compound or combined force-limiting appliance associated with the motor-speed reducer set and comprising a dynamometric transducer adapted to stop the motor-speed reducer set when a force opposing the controlled motion reaches a predetermined threshold value defined by the transducer.

According to a further feature of the invention, with the curtain positioned in a selectively variable stationary partially closing position, said compound or combined force-limiting appliance further comprises a dynamometric shaft operatively connected to the dynamometric transducer and operating the motor-speed reducer set so as to lower the curtain towards its position of fully closing the passage-way opening when an overload applied to the curtain in the stationary partially closing position exceeds a predetermined threshold value defined by the dynamometric shaft and smaller than the predetermined threshold value defined by the dynamometric transducer.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non-limiting example only and illustrating a presently preferred specific embodiment of the invention and wherein.

DESCRIPTION OF THE PREFERRED EMBODIMENTS

Generally speaking, the closing device according to the invention comprises a bilaterally guided curtain 1 with a prime mover-responsive drive motion.

Figure 4:
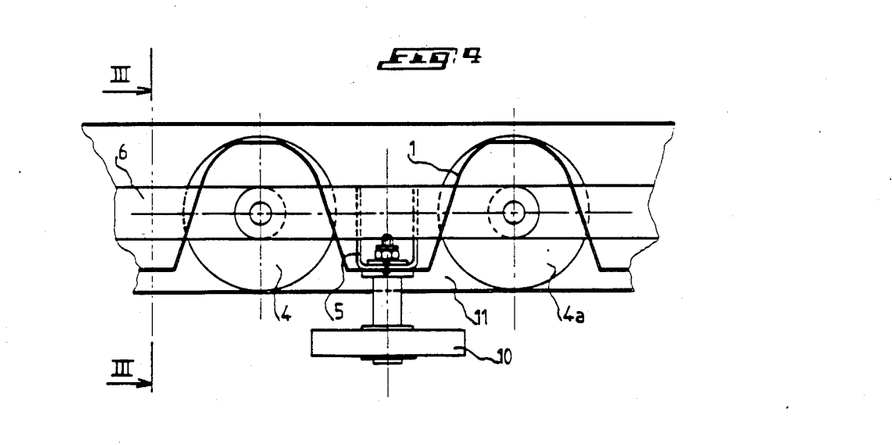
FIG. 4 is a view in cross-section taken upon the line IV—IV of FIG. 3.
Figures 7, 8:
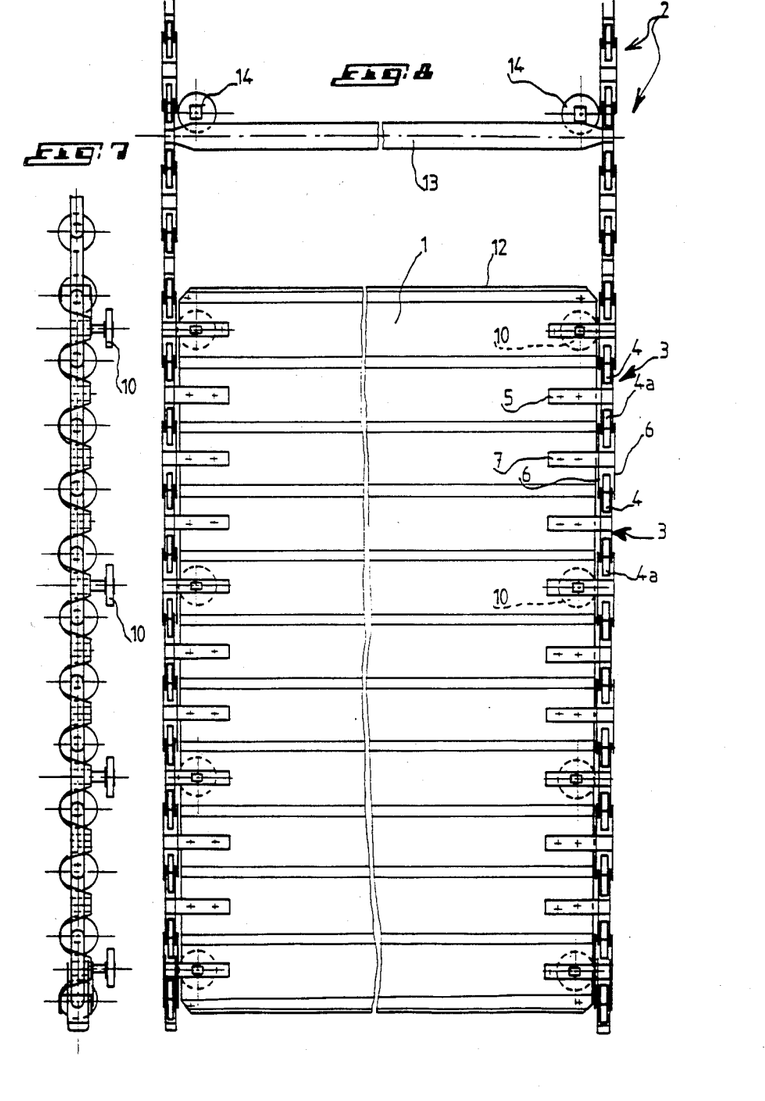
FIGS. 7 and 8 are detail views seen in the directions of the arrows VII and VIII of FIG. 1, respectively, showing the curtain used in the device according to the invention.

The curtain 1 is preferably provided as a corrugated or fluted metal sheet (made for instance from aluminum alloy) with corruations or ridges of substantially trapezoidal cross-section (FIG. 4 and 7).

This sheet combines a great transverse stiffness enabling same in particular to withstand overloads due to the wind over substantial spans with a longitudinal resilience or elasticity permitting to retain a ready operation when moving through curves of reduced radii.

Figure 3:
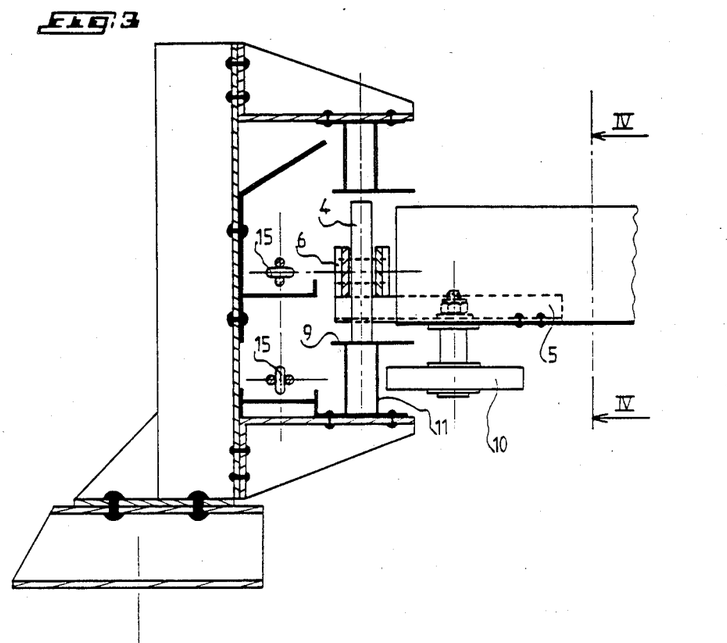
FIG. 3 is a detail view seen in the direction of the arrow III of FIG. 1.

The curtain 1 is supported on either side by a curtain-carrying chain 2 consisting of trolleys or carriages 3 fitted with two successive rollers or wheels 4, 4a and forming links secured respectively to the curtain 1 through the agency of rigid fastening elements such as for instance U-shaped transverse plates 5 welded to the curtain 1 (FIGS. 3, 4 and 8). The trolleys 3 of each chain are connected to each other by two intermediate connecting links 6 on which are fastened further transverse elements 7 for connection with the curtain 1.

The rollers or wheels 4, 4a of each chain are movable in a corresponding lateral guideway 9 located outwards of the curtain 1.

The curtain 1 is moreover guided sidewise by transverse guide rollers or skid-like pads 14 adjacent to its ends (FIG. 8).

Figure 1:
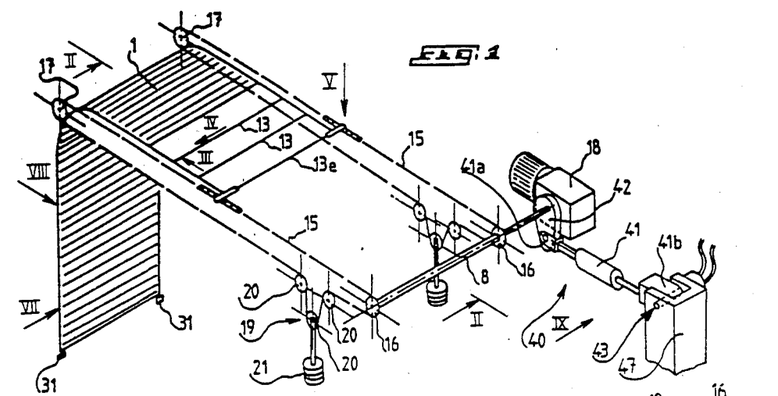
FIG. 1 is a perspective view illustrating the principle of the closing device according to the present invention.

With each curtain-carrying chain 2 is associated an endless flexible drive gearing member such as a rope, cable or chain 15 extending horizontally and outside of the curtain 1. As shown in FIG. 1, each drive chain 15 is reeved over a drive end idler pulley 16 and a driven end idler pulley 17. The drive pulleys 16 are operatively connected to each other by a transverse shaft 8 rotatable by suitable actuating means such as an irreversible motor-speed reducer set of the worm gear type for instance which is mounted in floating relationship, i.e. directly supported on the transverse shaft 8.

Each drive chain 15 preferably comprises tensioning, stretching or like tightening means 19 consisting of an assembly of three pulleys 20 arranged in a triangular fashion the lowest of which is made fast with a counterweight 21.

Figure 5:
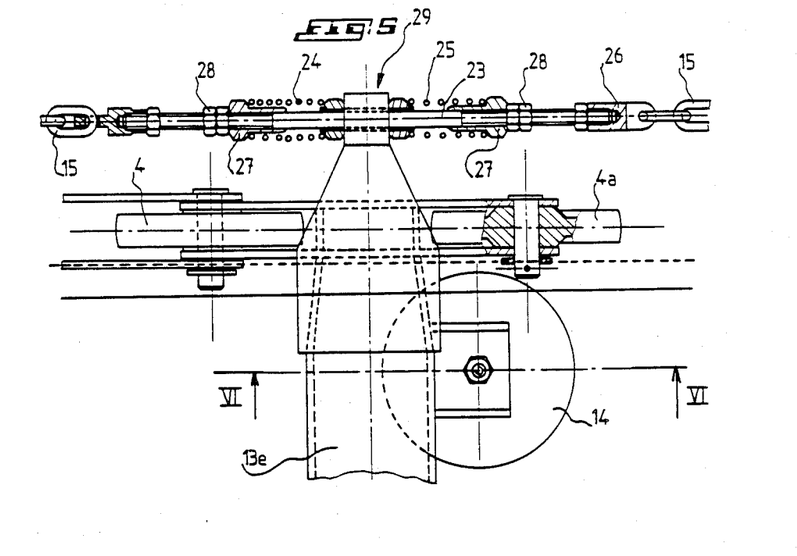
FIG. 5 is a detail view seen in the direction of the arrow V of FIG. 1 and showing the drive of the curtain-carrying chain according to the invention.
Figure 6:
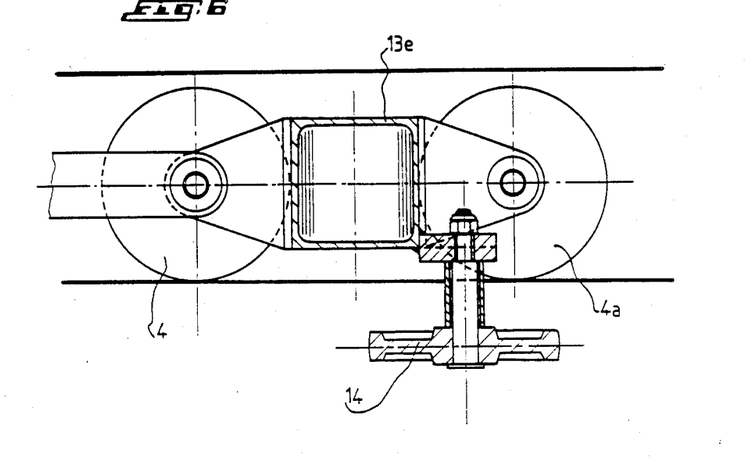
FIG. 6 is a view in cross-section taken up the line VI—VI of FIG. 5.

Each curtain-carrying chain 2 is operatively connected to a corresponding drive chain 15 at the drive end cross-member 13e (FIGS. 1, 5 and 6). The bracing cross-member 13e is advantageously connected with both of its ends to each drive chain 15 through a bilateral connection in the direction of the drive pulling force.

This bilateral resilient connection comprises a rod 23 extending in freely slidable relationship through the end of the drive bracing cross-member 13a and comprising a pair of opposing springs 24, 25 located on either side respectively of said cross-member end while bearing thereagainst, respectively, under a compressive prestress. The rod 23 is interposed within the drive transmission member 15 and forms an integral part thereof.

As shown on FIG. 5, the rod 23 comprises a non-threaded or smooth central portion extended on each side by a threaded portion for being fastened to the chain 15 through the medium of a threaded socket 26 formed with a lug and which is fastened more or less deeply onto the end of the rod. The springs 24 and 25 are adjustably prestressed by means of screw threaded stop-like sleeves 27 locked by check-nuts 28.

The operation of the closing device according to the invention may be easily inferred from the construction which has just been described.

The drive gearing chains 15 rotated by means of the motor 18 would drive through the agency of the end bracing cross-member 13e the curtain 1 towards the position of closing or opening the passage-way opening according to the direction of rotation of the motor.

The curtain 1 is guided on both sides by both lateral and transverse guideways 9 and 11 for travelling along a track comprising a vertical portion for the straight translatory motion for at least partially closing and for opening the passageway opening, an upper portion for straight translatory motion for storing the curtain 1, said upper portion being connected to said vertical portion by an arcuate intermediate portion.

The vertical portion of each lateral guide way terminates into a stop 31.

With reference to FIG. 5, the operation of the bilateral resilient connection 29 will now be described. At the start of the closing stroke, the spring 25 is gradually compressed against the ends of the end cross-member 13e thereby permitting a progressive and damped starting motion of the curtain 1.

When the curtain is moving downwards along the vertical portion, it gradually becomes driving under the action of its own weight and the spring 25 would gradually expand whereas the spring 24 is in turn compressed while damping the transition between the driven and driving steps of the curtain operation.

When the curtain 1 reaches the end of its stroke and engages the stop 31, the links of the chain 2 would assume a slightly zig-zag-like configuration in view of the clearance left between the rollers and their runways. When the whole curtain is in the closed end position, the chain 15 keeps moving thereby decompressing the spring 24 and the travel is stopped when the balance position of the springs 24 and 25 is obtained. Thus is removed from the drive chain 15 any force due to the own weight of the curtain and possibly to the additional weight (such as the ice for instance collecting or gathering onto the curtain) while more closing up the zig-zag shaping of the links of the chain 2.

The reverse process is carried out duing the opening operation.

At the end of the opening step, when the chain 15 stops moving, the motion of the curtain 1 is itself stopped when the equilibrium is restored between the compression of the spring 24 and the force required for moving the curtain. The chain 15 would then no longer sustain that force.

Figure 2:
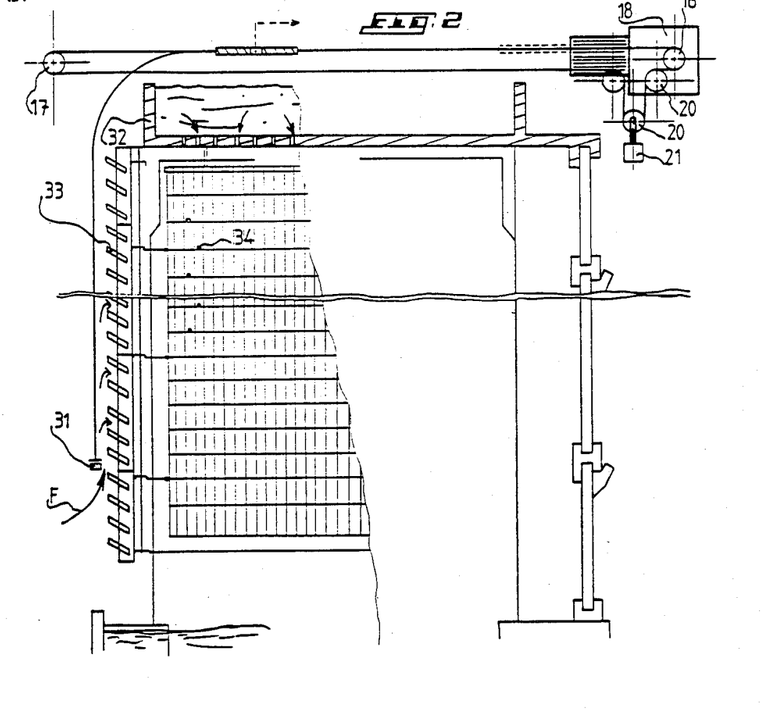
FIG. 2 is a view in cross-section taken upon the line II—II of FIG. 1 and showing the use of the closing device according to the invention as a mechanical antifreeze shutter to protect the inside of the streaming or trickling area of an atmospheric cooling tower for a nuclear power generating station.

On FIG. 2 has been shown a use of the previously described closing device as a mechanical anti-freeze shutter adapted to protect in particular the inside of the scattering area of an atmospheric cooling tower for a nuclear power generating plant.

As known per se, this tower is surrounded at its lower or base portion by a substantially cylindrical ring-shaped structure carrying an open-air channel-like pond 32 into which the cooling water would arrive at a temperature of about 38° C. Within this ring-shaped construction is provided a scattering structure consisting of horizontal slats 34 made from plastics material and caught or hanged up on vertical stainless steel lattices suspended from the top pond or channel 32. The hot water would drip into this scattering area owing to spray nozzles provided in the bottom of the pond. A fresh air current or stream (F) coming from the outside of the tower would cross the path of travel of the water which is flowing through the scattering device thus providing a heat exchange. The aerodynamic flow of the air is facilitated by stationary louvers 33 arranged at the periphery of the tower. After having been scattered or spread out, the water cooled down to 28° C. is recycled.

The closing device according to the invention is arranged outside of the cooling tower and prevents cold air from flowing directly into the inside of the tower. Thus, very little frost would build up and the operation of the tower remains normal even when the outside air is very cold. The efficiency or effectiveness and econdomy of the cooling operation are thus substantially increased, especially as the device according to the invention permits the possible thaw to be speeded up inside of the tower.

Moreover, the design of the closing device permits to control or adjust the shut surface area in accordance with variations in temperature and with the prevailing winds.

The use of a curtain consisting of one single continuous element without any pivotal or hinged connection is very advantageous since it removes the possible defects inherent with joints such as a bad fluid-tightness, corrosion, freezing or icing or seizing.

Figure 9:
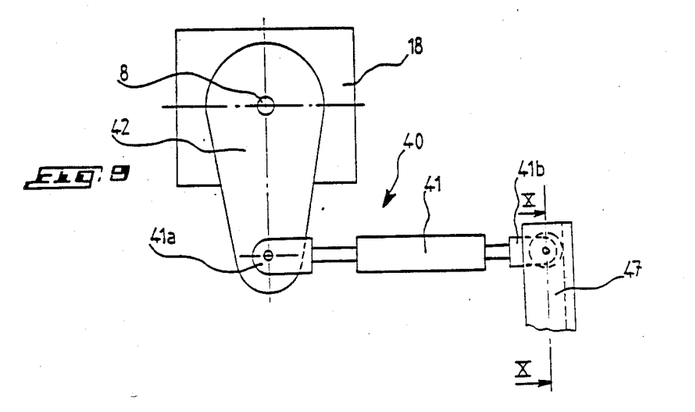
FIG. 9 is a view seen in the direction of the arrow IX of FIG. 1.
Figure 10:
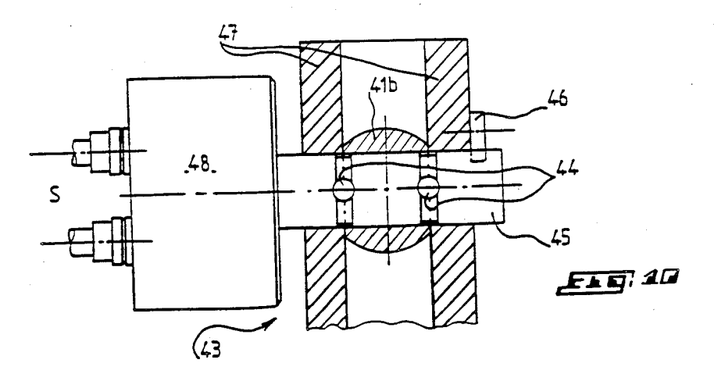
FIG. 10 is a view on a larger scale in cross-section taken upon the line X-X of FIG. 9.

The invention furthermore comprises, as shown on FIGS. 1, 9 and 10, a compound or combined force limiting device 40 arranged at the output of the motor-speed reducer set 18 and comprising a dynamometric transducer 41 such for instance as the transducer commercially known under the name DYNASTAT (registered trademark) and having one of its yoke-shaped or clevis-like ends 41a pivotally connected to the bottom end of a reaction arm 42 through which the transverse shaft is extending and which is made fast with the frame of the motor-speed reducer set 18 through suitable means (not shown) such as for instance fastening screws.

The limiter device 40 further comprises a device forming a dynamometric shaft 43 comprising strain gauges 44 measuring the shearing stresses within the dynamometric shaft proper 45. The shaft 45 is held against rotary motion by a lock plate 46 made fast with a stationary holder 47 outside of the system. The shaft 45 is mounted within the stationary holder 47 as shown on FIG. 10. The dynamometric shaft device 43 also comprises an electronic circuit known per se designated by the reference numeral 48 and associated with the shaft 45 to provide at the output S an electrical signal representative of the overshooting of an overload limit value as subsequently described.

The motor-speed reducer set 18 actuates through the agency of the drive system the movement of the curtain 1 for instance from its position of closing the passageway opening as shown on FIG. 1 to its horizontal storage position. On account of the floating mounting of the motor-speed reducer set 18, a reaction force responsive to the force provided by the motor-speed reducer set 18 for moving the curtain 1 is applied to the reaction arm 42. This reaction force is transmitted to the dynamometric transducer in which are arranged electrical contact breakers adapted to stop the motor-speed reducer set 18 when the reaction force which is a pulling or pushing force according to the direction of displacement of the curtain 1 reaches a predetermined threshold value. Thus, in the course of operation of the curtain 1, if undue forces occur due for instance to a jamming or blocking of the rollers of the curtain-carrying chain within the corresponding guideway, this operation is discontinued by the motor-speed reducer set 18 being stopped when these undue forces reach the threshold value defined by the dynamometric transducer 41.

In order to vary the air intake flow rate in accordance with the outside temperature, the curtain 1 is stopped at a selectively adjustable intermediate stationary position of partial closing. The selection of the intermediate positions may for instance be effected by counting the number of revolutions of the shaft 8 by means of an optical or mechanical device. At each one of these intermediate positions, the weight of the curtain is directly sustained by the curtain-carrying chains hence by the gearing or transmission system. Now, during the winter periods, the building up or formation of ice may unduly overload the curtain 1 at the intermediate stationary position and this overload may cause the transmission system to fail or break. The dynamometric shaft device 43 is adpated to take over through the agency of the reaction arm 42 the force applied to the transmission system 15 by the weights of the curtain 1 and of the ice built up thereon. When the overload reaches a predetermined threshold value defined by the dynamometric shaft device 43, the latter delivers an electrical control signal to the motor-speed reducer set 18 for actuating the latter in order to move the curtain down towards the position of fully shutting the passage-way opening, in which position the curtain would bear or rest on the bottom stops 31. By way of example, the lowering of the curtain 1 would take place when the ice load on the curtain 1 reaches 1,186 daN. The electronic circuit 48 of the dynamometric shaft device has of course been set, calibrated or adjusted in the factory to a value corresponding for instance to an ice load of 1,186 daN.

It should be pointed out that it is possible to provide a logic circuit adapted to neutralize the action of the dynamometric shaft in the course of the operation of the curtain 1 in order to avoid the difficulties of interferences between the operations of the transducer 41 and of the dynamometric shaft 43, respectively.

The design of such a circuit would be obvious for anybody skilled in or conversant in the art and has not to be disclosed in detail.

What is claimed is:

1. A device for at least partly closing a vertical passageway opening in a building, comprising
   a continuous transversely rigid and longitudinally flexible curtain guided on both sides by two lateral guideways,
   each guideway comprising a vertical portion for a straight translatory motion for at least partially closing and opening said passageway opening and a substantially horizontal upper portion for a translatory storing motion and connected to the vertical portion through an arcuate intermediate portion,
   control means for operating the motion of the curtain through drive means,
   wherein said curtain is directly supported on each side by a curtain-carrying chain fitted with rollers riding in a corresponding lateral guideway secured to the edge of the curtain and extending over the whole length of the curtain and beyond an upper end of the curtain,
   both chains being rigidly interconnected at their extensions by a plurality of bracing cross-members having an end bracing cross-member which is connected with its respective opposite ends, to the drive means associated with each curtain-carrying chain and extending horizontally and outside of the curtain.

2. A device according to claim 1, wherein
   said drive means are constituted by a flexible endless drive transmission member reeved over an idler drive end pulley and an idler driven end pulley, and
   said end bracing cross-member is connected through a bilateral resilient connection in a direction of a drive pulling force and comprising a rod extending in freely sliding relationship through the end of said drive end bracing cross-member and a pair of opposing springs located on either side respectively of said bracing cross-member end while bearing thereagainst under a compressive prestress,
   the rod being interposed within said drive transmission member and forming an integral part thereof.

3. A device according to claim 1, wherein said flexible curtain is a unidirectionally corrugated curtain.

4. A device according to claim 1, wherein each bracing cross-member carries a transversely guiding roller adjacent to its ends.

5. A device according to claim 2, wherein said flexible drive transmission member is a rope.

6. A device according to claim 2, further comprising means for tensioning said flexible transmission member.

7. A device according to claim 1, wherein
   said curtain-carrying chain is constituted by an assembly of trolleys fitted with two successive rollers and forming links secured to the curtain respectively and connected to each other by at least one intermediate connecting link,
   each said bracing cross-member interconnecting two corresponding trolleys of both curtain-carrying chains.

8. A device according to claim 1, wherein
   said control means include an irreversible motor-speed reducer set which is directly supported on a drive shaft of said drive means, and
   a compound force limiter associated with said motor-speed reducer set and comprising a dynamometric transducer adapted to stop the motor-speed reducer set when a force opposing the motion of the curtain and due to a blocking of the rollers of the curtain-carrying chain within the corresponding guideway reaches a predetermined threshold value defined by said transducer.

9. A device according to claim 8, wherein
   said curtain is positioned in a selectively variable stationary position of partial closing, and
   said compound force limiter further comprises a dynamometric shaft connected to said transducer and operating said motor-speed reducer set so as to lower said curtain towards its position of fully closing said passageway opening when an overload applied to the curtain at the stationary position of partial closing exceeds a predetermined threshold value defined by said dynamometric shaft and smaller than the predetermined threshold value defined by said transducer.

10. A device according to claim 8, wherein
    said dynamometric transducer is located at the output of the motor-speed reducer set and is pivotally connected at one of its ends to a reaction arm made fast with a frame of the motor-speed reducer set, said drive shaft extending freely through said arm, and
    the dynamometric shaft is pivotally connected to the other opposite end of said transducer.

11. A device according to claim 1, forming a mechanical anti-freeze shutter protecting the inside of a scattering area of an atmospheric cooling tower for a nuclear power generating station.

12. A device for at least partly closing a vertical passageway opening in a building, comprising
    a continuous transversely rigid and longitudinally flexible curtain guided on both sides by two lateral guideways,
    each guideway comprising a vertical portion for a straight translatory motion for at least partially closing and opening said passageway opening and a substantially horizontal upper portion for a translatory storing motion and connected to the vertical portion through an arcuate intermediate portion,
    control means for operating the motion of the curtain through drive means,
    wherein said curtain is supported on each side directly by a curtain-carrying chain fitted with rollers riding in a corresponding lateral guideway secured to the edge of the curtain and extending over the whole length of the curtain and beyond an upper end of the curtain,
    both chains being rigidly interconnected at their extensions by a plurality of bracing cross-members having an end bracing cross-member which is connected with its respective opposite ends to the drive means constituted by a flexible endless drive transmission member associated with each curtain-carrying chain and extending horizontally and outside of the curtain, while being reeved over an idler drive end pulley and an idler driven end pulley, and wherein said end bracing cross-member is connected to each drive transmission member through a bilateral resilient connection in a direction of a drive pulling force and comprising a rod extending in freely sliding relationship through the end of said drive end bracing cross-member and a pair of opposing springs located on either side respectively of said bracing cross-member end while bearing thereagainst under a compressive prestress, the rod being interposed within said drive transmission member and forming an integral part thereof.

13. A device for at least partly closing a vertical passageway opening in a building, comprising a continuous transversely rigid and longitudinally flexible curtain guided on both sides by two lateral guideways, each guideway comprising a vertical portion for a straight translatory motion for at least partially closing and opening said passageway opening and a substantially horizontal upper portion for a translatory storing motion and connected to the vertical portion through an arcuate intermediate portion, control means for operating the motion of the curtain through drive means, wherein said curtain is directly supported on each side by a curtain-carrying chain fitted with rollers riding in a corresponding lateral guideway secured to the edge of the curtain and extending over the whole length of the curtain and beyond an upper end of the curtain, both chains being rigidly interconnected at their extensions by a plurality of bracing cross-members having an end bracing cross-member which is connected with its respective opposite ends to the drive means associated with each curtain-carrying chain and extending horizontally and outside of the curtain, and wherein said control means include an irreversible motor-speed reducer set which is directly supported on a drive shaft of said drive means, and a compound force limiter associated with said motor-speed reducer set and comprising a dynamometric transducer adapted to stop the motor-speed reducer set when a force opposing the motion of the curtain and due to a blocking of the rollers of the curtain-carrying chain within the corresponding guideway reaches a predetermined threshold value defined by said transducer.

* * * * *